United States Patent [19]

Hoshiba et al.

[11] Patent Number: 4,787,868
[45] Date of Patent: Nov. 29, 1988

[54] TORSIONAL VIBRATION DAMPING MEANS FOR MARINE PROPULSION DEVICE

[75] Inventors: Akihiko Hoshiba; Hiroaki Fujimoto, both of Hamamatsu, Japan

[73] Assignee: Sanshin Kogyo Kabushiki Kaisha, Hamamatsu, Japan

[21] Appl. No.: 764,766

[22] Filed: Aug. 12, 1985

[30] Foreign Application Priority Data

Aug. 30, 1984 [JP] Japan .............................. 59-179226

[51] Int. Cl.⁴ ............................................... B63H 1/15
[52] U.S. Cl. ........................................ 440/52; 464/180
[58] Field of Search ................ 440/52, 83; 74/574; 464/180

[56] References Cited
U.S. PATENT DOCUMENTS

| 2,403,478 | 7/1946 | Burnat ................................ 74/574 |
| 2,772,649 | 12/1956 | Gensheimer et al. ................ 440/52 |
| 3,002,489 | 10/1961 | Watkins ............................... 440/52 |
| 3,733,923 | 5/1973 | Goodrich et al. ................... 464/180 |
| 3,901,101 | 8/1975 | McGavern ........................... 74/574 |
| 3,995,513 | 12/1976 | Amdall et al. ...................... 464/180 |
| 4,044,628 | 8/1977 | Jacks .................................. 464/180 |
| 4,127,080 | 11/1978 | Lakiza et al. ....................... 440/83 |

Primary Examiner—Joseph F. Peters, Jr.
Assistant Examiner—Jesús D. Sotelo
Attorney, Agent, or Firm—Ernest A. Beutler

[57] ABSTRACT

An outboard drive having an improved arrangement for absorbing torsional vibrations and isolating the drive shaft from them. Several embodiments of torsional vibration dampers are disclosed each of which includes a first member that is detachably connected to the drive shaft and an inertial member that is coupled to the first member. In some embodiments, this coupling is achieved by an elastomeric sleeve and in others it is achieved by means of a viscous fluid.

11 Claims, 2 Drawing Sheets

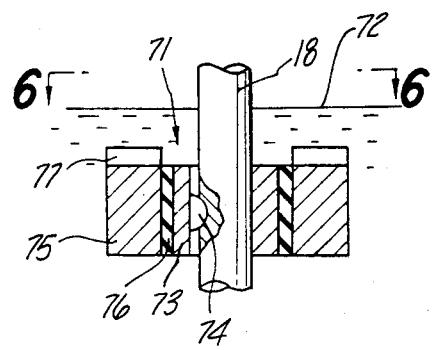
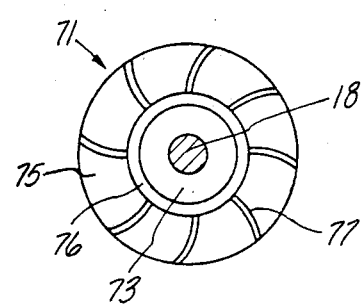
Fig-5      Fig-6
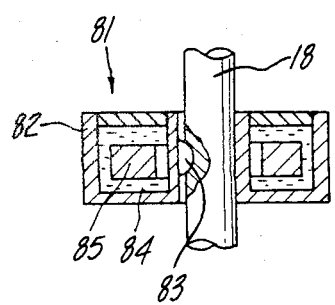
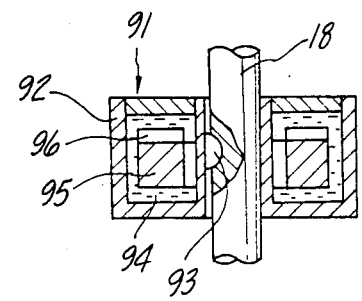
Fig-7      Fig-8

TORSIONAL VIBRATION DAMPING MEANS FOR MARINE PROPULSION DEVICE

BACKGROUND OF THE INVENTION

This invention relates to a torsional vibration damping means for a marine propulsion device and more particularly to an improved arrangement for damping torsional vibrations in the drive shaft of a marine drive.

As is well known, marine drives include drive shaft housing in which a drive shaft is rotatably journaled and which drives a propulsion device that is carried by a lower unit, positioned at the lower end of the drive shaft housing. The propulsion device may comprise either a propeller or other types of known devices utilized for this purpose. This type of marine drive is common to the outboard drive unit of an inboard/outboard drive or the drive shaft housing and lower unit of an outboard motor. The drive shaft is subject to a number of torsional vibrations and the marine propulsion unit itself adds to these torsional vibrations. Frequently, the unit also encounters shock loading such as when a propeller strikes an underwater object and this coupled with the torsional fatigue of the drive shaft can very well cause failure of the drive shaft.

It is, therefore, a principle object of this invention to provide an improved arrangement for damping torsional vibrations in the drive shaft of a marine drive.

It is another object of this invention to provide an improved arrangement for damping the torsional vibrations of the drive shaft of a marine propulsion unit.

SUMMARY OF THE INVENTION

This invention is adapted to be embodied in a marine outboard drive comprising a drive shaft housing journaling a drive shaft that is driven by a power source. A lower unit contains propulsion means for propelling an associated watercraft and means are provided for driving the propulsion means from the drive shaft. In accordance with the invention, torsional vibration damping means are directly connected to the drive shaft for reducing the effects of torsional vibrations on the drive shaft.

BRIEF DESCRIPTION OF THE DRAWINGS

FIG. 5 is a cross-sectional view, in part similar to FIGS. 2 through 4, and shows a yet further embodiment of the invention.

FIG. 6 is a view taken in the direction of the line 6—6 in FIG. 5.

FIG. 7 is a cross-sectional view, in part similar to FIGS. 2 through 5, showing still another embodiment of the invention.

FIG. 8 is a cross-sectional view, in part similar to FIGS. 2 through 5 and 7, showing a still further embodiment of the invention.

DETAILED DESCRIPTION OF THE PREFERRED EMBODIMENTS

Figure 1:
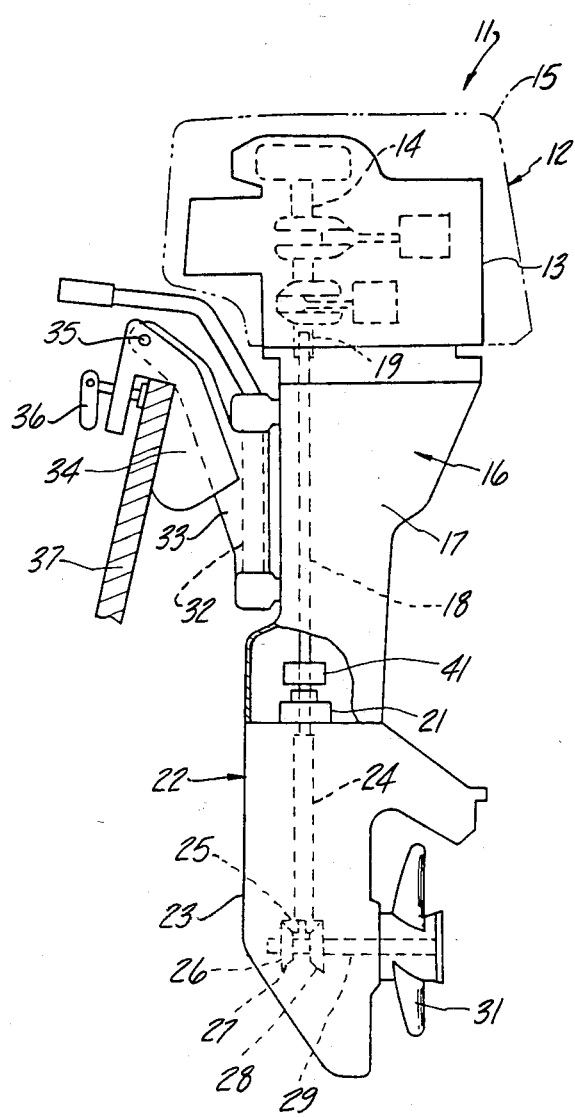
FIG. 1 is a side elevational view of an outboard motor constructed in accordance with an embodiment of the invention, with portions broken away and other portions shown in phantom.

As has been noted, the invention is particularly adapted for use in marine outboard drives for damping torsional vibrations of the drive shafts of either the outboard drive of an inboard/outboard or that of an outboard motor per se. In the drawings, the invention is shown in combination with an outboard motor and identified generally by the reference numeral 11. The outboard motor 11 includes a power head 12 that is comprised of an internal combustion engine 13 of any known type which has an output shaft 14 that rotates about a vertically extending axis. An outer protective cowling, shown in phantom and identified generally by the reference numeral 15, encircles the engine 13.

A drive shaft housing, indicated generally by the reference numeral 16, comprised of an outer casing 17 is affixed to the underside of the power head 12. A drive shaft 18 is journaled in the drive shaft housing 16 in an appropriate manner. The drive shaft 18 is rotatably coupled to the engine output shaft 14 by means of a coupling 19. Positioned at the lower end of the drive shaft housing 16 and within the casing 17 is a water pump 21 that is driven by the drive shaft 18 for supplying water from the body in which the motor 11 operates to the engine 13 for its cooling. This cooling water is then redischarged back to the body of water in which the motor 11 operates in a known manner.

A lower unit, indicated generally by the reference numeral 22, is affixed to the lower portion of the drive shaft housing 16. The lower unit 22 includes an outer casing 23 in which a drive shaft extension 24 is journaled. The drive shaft extension 24 carries a bevel gear 25 at its lower end that meshes with a forward, neutral, reverse transmission assembly 26 that consists of a pair of bevel gears 27 and 28 that are rotatably journaled on a propeller shaft 29 and mesh with opposite sides of the bevel gear 25 so that the gears 27 and 28 will be rotated in opposite directions. A known type of dog clutching mechanism (not shown) is provided for selectively coupling either of the gears 27 and 28 for rotation with the propeller shaft 29 to drive it and a propeller 31 which is affixed to it in a known manner, in either a forward or reverse direction. In addition, the dog clutching mechanism is provided with a neutral position wherein neither of the gears 27 and 28 will be rotatably coupled with the shaft 29 and a neutral condition will exist.

A steering shaft 32 is affixed to the drive shaft housing 16 and is journaled in a swivel bracket 33 for steering movement of the outboard motor 11 about a vertically extending axis defined by the steering shaft 32. The swivel braket 33 is pivotally connected bracket 34 by means of a tilt pin 35 for tilting movement of the outboard drive 11 about a horizontally extending tilt axis as defined by the tilt pin 35. The clamping bracket 34 is, in turn, provided with a clamping assembly 36 so that the outboard motor assembly 11 may be connected to a transom of a watercraft 37 in a known manner.

The construction of the outboard motor 11 as thus far described is conventional and for that reason only the general construction of it has been described. The conventional outboard motor or the outboard drive of an inboard/outboard unit has certain problems, as aforenoted, in that the drive shaft 18 is subject to torsional vibrations that can weaken it through fatigue through long periods of use. When the drive shaft 18 is thus fatiqued and the propeller 31 strikes an object, or even under the vibrational loadings, the drive shaft 18 may fail. In accordance with the various embodiments of this invention, a torsional vibration damper, indicated by the reference numeral 41 is affixed to the drive shaft 18 in proximity to the water pump 21 for absorbing these torsional vibrations and relieving the drive shaft 18 from such loading. A number of various embodiments of torsional dampers are illustrated in FIGS. 2, 3, 4, 5 and 6, 7 and 8 and reference will now be had to these figures for a description of the specific torsional dampers which may be employed in connection with the invention.

Figure 2:
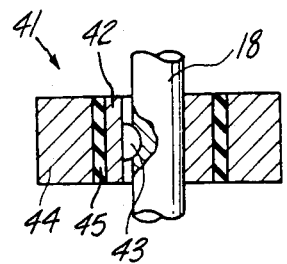
FIG. 2 is an enlarged cross-sectional view showing a first embodiment of a torsional vibration damper.

Referring first to FIG. 2, the damper 41 includes an inner hub member 42 that is detachably and axially affixed to the drive shaft 18 for rotation with the drive shaft 18 by means of a key 43. An outer inertial member 44 is connected to the inner member 42 by means of an elastomeric sleeve 45 so that the outer member 44 may rotate slightly relative to the inner member 44 so as to absorb torsional vibrations. The elastomeric member 45 may be affixed to the members 44 and 42 in any suitable manner as by adhesive bonding, vulcanizing or the like.

Figure 3:
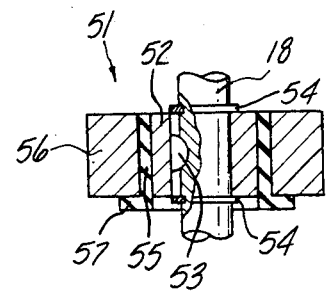
FIG. 3 is a cross-sectional view, in part similar to FIG. 2, showing another embodiment of the invention.

FIG. 3 shows another embodiment of this invention and the torsional vibration damper of this embodiment is identified generally by the reference numeral 51. The torsional vibration damper 51 and its manner of connection to the drive shaft 18 is slightly different from the previously described embodiment and this embodiment permits the use of a somewhat looser fit between the damper 51 and the drive shaft 18 so as to facilitate assembly.

In this embodiment, an inner hub member 52 is rotatably connected to the drive shaft 18 by means of a key 53. The inner member 52 is axially affixed relative to the drive shaft 18 by means of a pair of snap rings or "C" clips 54 that are received in grooves in the drive shaft 18. An elastomeric member 55 couples the inner member 52 to an outer inertial member 56 so as to provide vibration damping. In this embodiment, the elastomeric member 55 has a generally L-shape cross-section and includes a radially extending flange 57 that underlies the inertial member 56.

Figure 4:
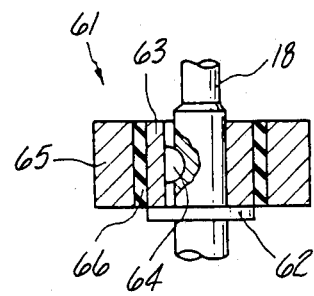
FIG. 4 is a cross-sectional view, in part similar to FIGS. 2 and 3, showing a still further embodiment of the invention.

A torsional vibration damper constructed in accordance with yet another embodiment of the invention is identified by the reference numeral 61 in FIG. 4. This embodiment is similar to the embodiment of FIG. 3 in that it permits a looser fit of the vibration damper 61 to the drive shaft 18. In this embodiment, the drive shaft 18 is provided with an annular shoulder 62 that underlies an inner hub member 63 of the inertial member 61. The inner member 63 is rotatably coupled to the drive shaft 18 by means of a key 64 and it is axially held in place by its weight acting on the shoulder 62. An inertial member 65 of the damper 61 is connected to the inner member 63 by means of an elastomeric sleeve 66 so as to permit the absorption of torsional vibrations.

FIGS. 5 and 6 show a still further embodiment of the invention wherein a torsional vibration damper constructed in accordance with this embodiment is identified generally by the reference numeral 71. In this embodiment, the torsional vibration damper 71 is designed so as to operate under the level 72 of the body of water in which the outboard motor 11 is operating. Alternatively, the outboard motor 11 may be provided with an internal system wherein a water cooling jacket is maintained in the drive shaft housings 16 so that the water level 72 will be above the level of water in which the outboard motor 11 is operating. Such a water jacket may be formed and supplied in the manner as shown in U.S. Pat. No. 4,421,490, entitled "Exhaust Silencer Structure For Outboard Engines", issued Dec. 20, 1983 in the name of Ryoji Nakahama and assigned to the assignee of this application.

The torsional vibration damper 71 includes an inner hub member 73 that is affixed to the drive shaft 18 in any of the manners as shown in the embodiments of FIGS. 2 through 4, for example, by means of a key 74. An outer inertial member 75 is affixed to the inner member 73 by means of an elastomeric sleeve 76 so as to provide for relative rotation. The upper and/or lower surface of the inertial member 75 is provided with a number of fins or vanes 77 that extend beneath the water level 72. These fins or vanes 77 and their cooperation with the water will increase the effective weight or inertia of the member 75 and will additionally transfer heat generated by the torsional vibrations into the water 72 for more rapid dissipation.

Another embodiment of the invention which employs a fluid coupling rather than an elastomeric coupling is shown in FIG. 7 wherein the torsional vibration damper is identified generally by the reference numeral 81. This member 81 includes an annular housing assembly 82 that is non-rotatably affixed to the drive shaft 18 in any of the manners as shown in FIGS. 2 through 4, for example, by means of a key 83. The member 82 has a hollow opening that is filled with a viscous fluid 84 such as silicone and in which an inertial member 85 is supported. Upon torsional vibrations, the member 85 may move relative to the member 82 with the fluid 84 acting as a fluid coupling so as to achieve torsional vibration absorption.

A similar viscous torsional vibration damper is identified generally by the reference numeral 91 in FIG. 8. Like the embodiment of FIG. 7, this embodiment includes a hollow outer housing 92 that is affixed to the drive shaft 18 in any suitable manner by means of a key 93. The housing 92 has an internal cavity that is filled with a viscous fluid 94 and in which an inertial member 95 is positioned. The inertial member 95 is provided with vanes 96 that cooperate with the viscous fluid 94 so as to increase the effective inertia of the member 95 and so as to afford some cooling.

It should be readily apparent from the foregoing description that a number of embodiments of the invention have been illustrated and described each of which provides effective torsional protection for the drive shaft and which can be conveniently and easily assembled. Although a number of embodiments of the invention have been illustrated and described, various other changes and modifications may be made without departing from the spirit and scope of the invention, as defined by the appended claims.

We claim:

1. In a marine outboard drive comprising a power head containing an internal combustion engine having an output shaft, a flywheel drive from one end of said output shaft, a drive shaft housing depending from said power head and journaling a drive shaft driven by the other end of said output shaft, a lower unit containing propulsion means for propelling an associated watercraft and means for driving said propulsion means from said drive shaft, the improvement comprising torsional vibration damping means directly connected to said drive shaft for reducing the effects of torsional vibrations on said drive shaft, said torsional vibration damping means comprising a first annular member detachably affixed for rotation with said drive shaft, an annular inertial member axially aligned with said first annular member and rotatably relative to said drive shaft, and means for coupling said inertial member to said first member for relative movement therebetween.

2. In a marine outboard drive as set forth in claim 1 wherein the coupling means comprises an elastomeric element disposed radially between said first annular member and said inertial member.

3. In a marine outboard drive as set forth in claim 2 wherein the first member has a keyed connection to the drive shaft and the inertial member comprises an annular member, the elastomeric element comprising an elastomeric sleeve interconnecting said first member with said inertial member.

4. In a marine outboard drive as set forth in claim 3 further including means for axially affixing the first member to the drive shaft independent of the keyed connection.

5. In a marine outboard drive as set forth in claim 4 wherein the means for axially affixing the first member to the drive shaft comprises a shoulder formed integrally on the drive shaft.

6. In a marine outboard drive as set forth in claim 4 wherein the means for axially affixing the first member to the drive shaft comprises a pair of snap rings.

7. In a marine outboard drive as set forth in claim 1 wherein the coupling means comprises a fluid connection.

8. In a marine outboard drive as set forth in claim 7 wherein the first member defines an annular cavity and the inertial member is received in the annular cavity and has an annular configuration, the area between the annular cavity and the inertial member being at least partially filled with a viscous fluid.

9. In a marine outboard drive as set forth in claim 8 wherein the inertial member has vanes formed thereon for cooperating with the viscous fluid for increasing the effective inertia of the inertial member.

10. In a marine outboard drive comprising a drive shaft housing journaling a drive shaft driven by a power source, a lower unit containing propulsion means for propelling an associated watercraft and means for driving said propulsion means from said drive shaft, the improvement comprising torsional vibration damping means directly connected to said drive shaft for reducing the effects of torsional vibrations on said drive shaft, said torsional vibration damping means comprising a first member detachably affixed to said drive shaft, an inertial member, and means for coupling said inertial member to said first member for relative movement therebetween, said inertial member being immersed in a body of water and having vanes for cooperating with the water for dissipating heat and for increasing its effective inertia.

11. In a marine outboard drive as set forth in claim 10 wherein the power source comprises a crankshaft having a vertically extending axis and the drive shaft is driven at the lower end of said crankshaft, and further including a flywheel affixed to the upper end of said crankshaft.

* * * * *